No. 874,526. PATENTED DEC. 24, 1907.
L. E. McLAUGHLIN & R. J. PARSONS.
TOY.
APPLICATION FILED MAY 6, 1907.
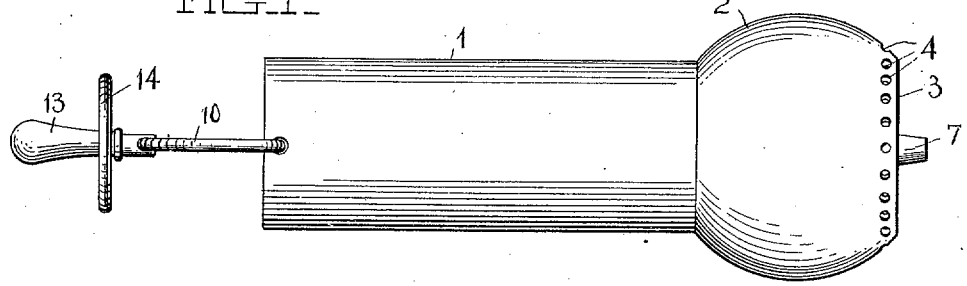
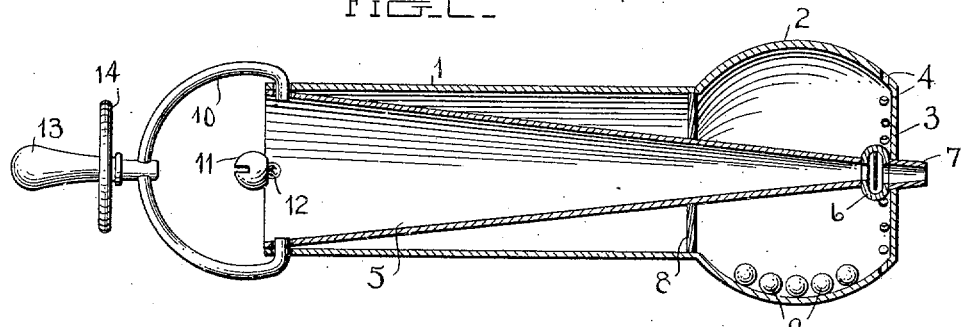
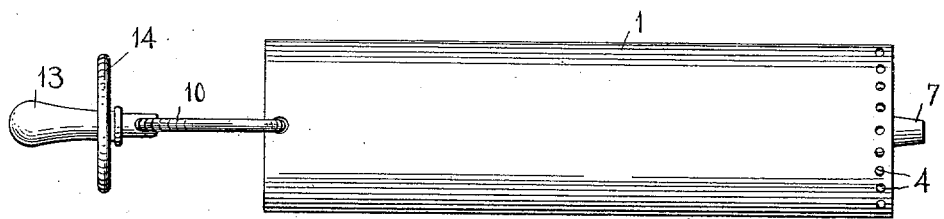
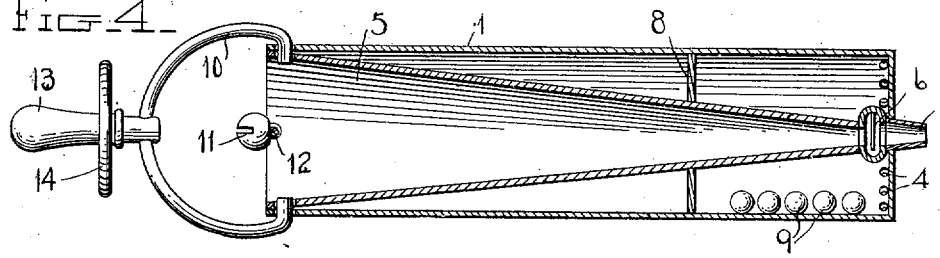
Witnesses
L. B. James
C. H. Griesbauer
Inventors
L. E. McLaughlin
R. J. Parsons
by H. B. Willson &co
Attorneys

UNITED STATES PATENT OFFICE.

LUTHER E. McLAUGHLIN AND ROBERT J. PARSONS, OF PRICEBURG, PENNSYLVANIA.

TOY.

No. 874,526.     Specification of Letters Patent.     Patented Dec. 24, 1907.

Application filed May 6, 1907. Serial No. 372,104.

*To all whom it may concern:*

Be it known that we, LUTHER E. MC-LAUGHLIN and ROBERT J. PARSONS, citizens of the United States, residing at Priceburg, in the county of Lackawanna and State of Pennsylvania, have invented certain new and useful Improvements in Toys; and we do declare the following to be a full, clear, and exact description of the invention, such as will enable others skilled in the art to which it appertains to make and use the same.

Our invention has relation to new and useful improvements in toys and essentially consists in a toy comprising a horn, rattle tones, ring, bell and nipple combined in a novel manner in the form of a toy, the same being of such a nature if desired as to readily be adapted to advertising purposes.

In the accompanying drawings in which like parts are designated by like characters of reference throughout the several views, Figure 1 is a side elevation of our invention; Fig. 2 is a longitudinal sectional view; Fig. 3 is a side elevation of a modified form of our invention; and Fig. 4 is a longitudinal sectional view of the same.

Referring more particularly to the drawings, 1 denotes a hollow cylinder or casing which preferably terminates at one end in a bulge or enlargement 2, having its outer end closed by a wall 3 and provided in its outer surface near its outer or closed end with a plurality of alining sound apertures 4, the purpose of which will be apparent. 5 represents a horn, which fits in said cylinder or casing 1 and has its smaller or reduced end attached in any desired manner to the inner end of a sounding member 6, having secured to its opposite end a mouth piece 7, of preferably tapered form, which extends through a corresponding opening in the in wall 3 of said bulge or enlargement 2. The numeral 8 represents an annular block of tin or other suitable material, which is secured around said horn at a point near the inner end of said bulge or enlargement 2 of said cylinder or casing 1, and serves to prevent the rattles 9 which are placed to work in said bulge or enlargement 2 from working themselves too near the open end of said cylinder and horn.

10 represents a substantially semi-circular bail of suitable material and having inturned terminal portions journaled in alined transverse perforations formed in the casing and horn and serving to pivot the bail to the casing and secure the horn in place within the latter. 11 represents a bell, preferably of the sleigh bell type, which is secured within and near the open end of said casing by a cross pin 12 or other equivalent means.

13 designates a nipple of suitable form which is secured at its inner end to the bail and is provided with a button 14.

In the modified form of our invention, if desired, we dispense with the said bulge or enlargement 2 at one end of said cylinder or casing and make the same of uniform diameter throughout its entire length, in which case, the reduced end of the horn, extends through a corresponding opening in the closed end of the cylinder. In this case, as will be apparent, the mouth piece is preferably located without said cylinder. This form of our invention is found very advantageous where it is desired to use the toy as an advertising medium, as the outer surface of the said cylinder provides a convenient place for placing advertising matter. In constructing our toy especially for advertising purposes, the same may be made up as nearly as possible to represent the original package that the product it is to advertise is put up in, for example, in advertising a certain brand of cigar, the toy would be made to represent a cigar of that particular brand, as nearly as possible; thus making up an advertising device that would be in a home for an indefinite period of time, and always more or less before the family. By inclosing the horn in the casing not only may the device be made in the form of a package for use in advertising, as above described, but also the resonance of the tone of the horn will be increased and, at the same time, softened.

In the construction and application of our invention, we claim the right to so construct and arrange the parts comprising the same that said sounding member 6 may be located either within or without said cylinder or casing in either form of our invention.

While we claim the right to make the toy of any size or shape, and if desired, to represent the size or shape of the original package in which the product is put up, if desired the same may be made up in miniature form and placed on the market in the form of a fob, to be attached to a chain, in which case, the mouth piece 7, is provided with suitable openings to facilitate the attaching of the fob to a chain. Said openings may be in either of said forms, the same being such that a string may be fastened therethrough.

While we have shown and described our invention in different forms or styles, in the construction of the same we claim the right to make such changes or alterations therein that fairly fall within the scope of our invention, and also to drop any one or more of the parts.

Having thus described our invention, what we claim as new and desire to secure by Letters-Patent, is:—

1. In a toy of the type described, a tubular casing having a wall at one end and its other end open, a horn extended longitudinally through and housed within the casing and having its open end disposed toward the open end of the latter, said horn being provided with a mouthpiece arranged to project outwardly through the end wall of the casing.

2. In a toy of the type described, a tubular casing having a wall at one end and its other end open, a conical horn extended longitudinally through and housed within the casing and having its mouthpiece projecting through an opening in the end wall of the casing, the enlarged open end of the horn being disposed toward the open end of the casing, a partition disposed at an intermediate point within the latter and forming a rattle-receiving compartment, and a plurality of rattles arranged within said compartment.

3. In a toy of the type described, a tubular casing having a wall at one end and its other end open, a horn extending longitudinally through and housed within the casing, said horn having a mouthpiece projected through the end wall of the casing and its open end disposed at the open end of the latter, the casing and horn being provided with alined transverse perforations, and a semi-circular bail having inturned terminal portions journaled in said perforations for pivoting the bail to the casing and holding the horn in position within the latter.

In testimony whereof we have hereunto set our hands in presence of two subscribing witnesses.

LUTHER E. McLAUGHLIN.
ROBT. J. PARSONS.

Witnesses:
SAMUEL MOSKOVITZ,
MORRIS EISENBERG.